United States Patent
Mimura et al.

(12) 
(10) Patent No.: US 6,393,189 B1
(45) Date of Patent: May 21, 2002

(54) OPTICAL BEAM DIAMETER REDUCER

(75) Inventors: Yoshinori Mimura; Yukio Noda; Tetsuya Nakai; Toshio Tani, all of Kamifukuoka (JP)

(73) Assignee: KDD Corporation, Tokyo (JP)

(*) Notice: Subject to any disclaimer, the term of this patent is extended or adjusted under 35 U.S.C. 154(b) by 0 days.

(21) Appl. No.: 09/507,624

(22) Filed: Feb. 17, 2000

(30) Foreign Application Priority Data

Feb. 18, 1999 (JP) .......................................... 11-039384

(51) Int. Cl.[7] ................................................. G02B 6/02
(52) U.S. Cl. ........................ 385/123; 385/124; 385/127
(58) Field of Search ................................ 385/123, 124, 385/126, 127

(56) References Cited

U.S. PATENT DOCUMENTS

| | | | | |
|---|---|---|---|---|
| 5,673,353 A | * | 9/1997 | Ward et al. ................. | 385/124 |
| 5,732,178 A | * | 3/1998 | Terasawa et al. ........... | 385/123 |
| 6,185,353 B1 | * | 2/2001 | Yamashita et al. .......... | 385/124 |

* cited by examiner

*Primary Examiner*—Cassandra Spyrou
*Assistant Examiner*—Euncha Cherry
(74) *Attorney, Agent, or Firm*—Christie, Parker & Hale, LLP

(57) ABSTRACT

An optical beam diameter reducer for reducing a beam diameter of an optical beam comprises a three-layer structure composed of a central core, a refractive index inclined layer formed outside the core which refractive index gradually decreases toward the outside in the radial direction and a cladding layer formed outside the refractive index inclined layer.

6 Claims, 1 Drawing Sheet

OPTICAL BEAM DIAMETER REDUCER

FIELD OF THE INVENTION

The present invention relates to an optical beam diameter reducer, more specifically to an optical beam diameter reducer for reducing a beam diameter of an optical beam.

BACKGROUND OF THE INVENTION

Fiber type optical devices such as a fiber type optical amplifier, a fiber laser and a fiber type nonlinear element need to raise optical power density inside a core for obtaining high-output, improved pumping efficiency or increased nonlinear effect. In order to increase the optical power density, a core diameter should be reduced or optical power of input light should be increased. However, as the core diameter becomes smaller, to increase the input light power becomes more difficult. Accordingly, it has been expected to develop a method that makes it possible to apply high electric power into an optical fiber with a small core diameter.

From the viewpoint of high output, a multimode laser diode (LD) is most desirable among conventional optical sources. When high output light of the multimode LD efficiently enters into an optical fiber having a small core diameter such as a single-mode optical fiber, extremely high optical power density is obtained. Therefore, a high output fiber type optical amplifier, a high output fiber laser and a highly effective fiber type nonlinear element can be realized.

However, since the output light from the multimode LD is large in diameter ranging from several tens $\mu$m to 200 $\mu$m, it is very difficult to enter it efficiently into a fiber core with a small core. In order to solve this problem, a taper type optical fiber has been proposed which core gradually tapers off from an input end to an output end. That is, in the taper type optical fiber, light entered from the input end with a large core diameter is converted into a waveguide mode with a small diameter while propagating in the fiber core which diameter gradually tapers off. When the light finally outputs from the output end with a small core diameter, its beam diameter becomes suitable for efficiently connecting with the following optical fiber.

As to a conventional taper type optical fiber, although it is possible to convert from a higher mode to a lower mode, the conversion from the higher mode into a single mode is difficult. Namely, when it is connected with a single mode optical fiber, high coupling efficiency could not be obtained.

Furthermore, since the core diameter of the taper type optical fiber varies in the longitudinal direction, it cannot be mass-produced by fiberdrawing from a single preform like ordinary optical fibers and thus has to be manufactured individually one by one. As a result, the taper type optical fibers are high-priced.

SUMMARY OF THE INVENTION

An object of the present invention is to solve the aforementioned problems and provide an optical beam diameter reducer for efficiently reducing a large diameter of an optical beam.

Another object of the present invention is to provide an optical beam diameter reducer which can be produced at a low price.

Further object of the present invention is to provide an optical beam diameter reducer which can be mass-produced by fiberdrawing from a single preform.

An optical beam diameter reducer according to the invention comprises a core with the highest refractive index; a refractive index inclined layer formed outside the core which refractive index is lower than that of the core and gradually reduces as approaching the outside in the radial direction; and a low refractive index layer formed outside the refractive index inclined layer which refractive index is lower than the lowest refractive index of the refractive index inclined layer.

Owing to the refractive index inclined layer, an optical beam of a large diameter can be concentrated efficiently on a core of a small diameter. The configuration of the optical beam diameter reducer is uniform in its longitudinal direction and therefore it can be produced easily and low-priced.

DESCRIPTION OF THE PREFERRED EMBODIMENT

An embodiment of the invention is explained below in detail with reference to drawings.

Figure 1A:
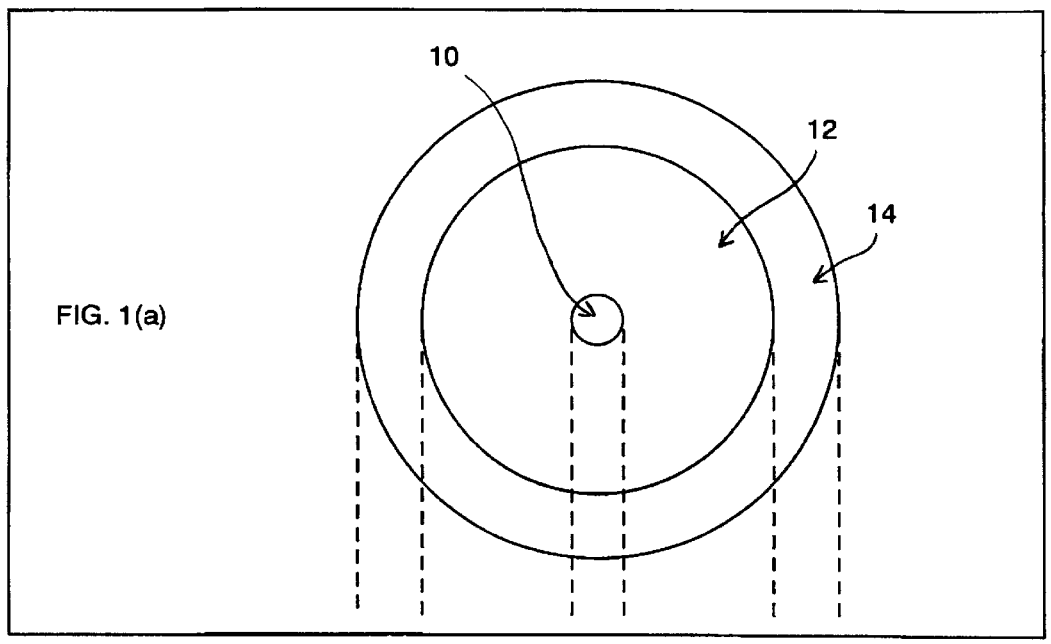
FIGS. 1(*a*) and 1(*b*) show respectively a cross sectional view and a refractive index distribution of an embodiment according to the invention.
Figure 1B:
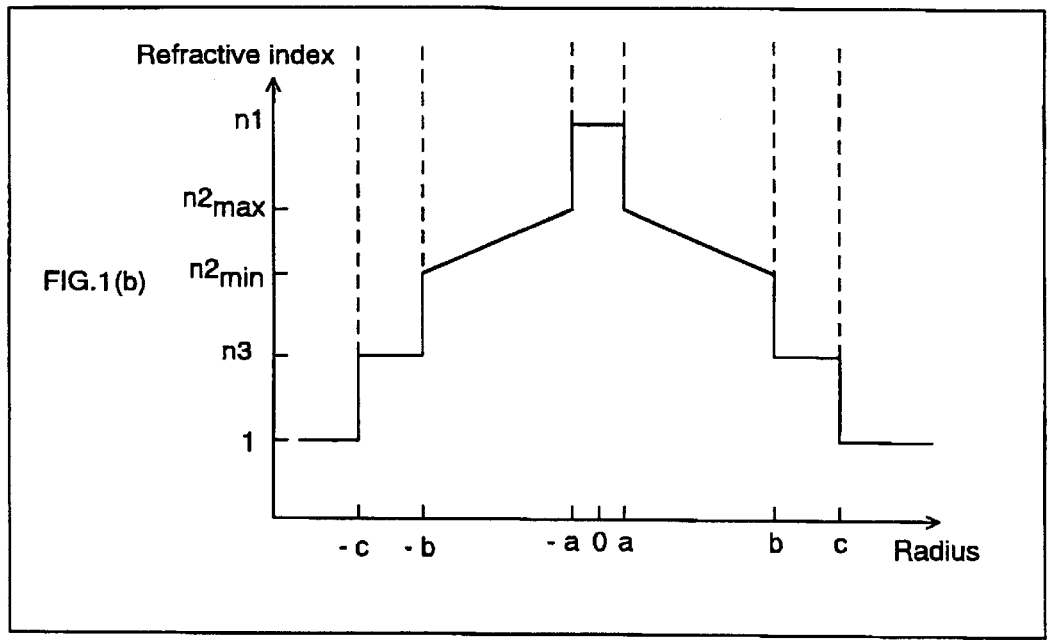

FIG. 1(*a*) shows a cross sectional view of an embodiment according to the invention and FIG. 1(*b*) shows the refractive index distribution within the cross section. In FIG. 1(*b*), the horizontal axis and the vertical axis show the radius and the refractive index respectively.

The optical fiber used in the embodiment comprises a three-layer structure consisting of a core 10 at the center, a refractive index inclined layer 12 located outside the core 10 which refractive index gradually reduces, and a cladding layer 14 located outside the refractive index inclined layer 12. The refractive index of the core 10 is expressed as n1 and the radius of the core 10 is expressed as a. The refractive index inclined layer 12 formed around the outside of the core 10 is located within the range between the radius a and a radius b. Its refractive index becomes the maximum of $n2_{max}$ at the radius a, decreases as approaching the outside in the radial direction and becomes the minimum of $n2_{min}$ at the radius b. The cladding layer 14 is located between the radius b and a radius c. The relation among the refractive indices of those three layers 10, 12 and 14 can be expressed as $n1 > n2_{max} > n2_{min} > n3$. This configuration is homogeneous in the longitudinal direction of the embodiment.

In FIG. 1(*b*), although the refractive index of the refractive index inclined layer 12 is illustrated to decrease in a straight line in the range of radius a to b, this is merely an example. The refractive index of the refractive index inclined layer 12 can show any refractive index distribution as far as it decreases in sequence toward the outside in the radial direction. As stated above, by disposing the layer 12, which refractive index lowers toward the outside in the radial direction, on the outside of the core 10, the input light can be concentrated on the core 10. It is widely known that a condensing function similar to that of a convex lens can be obtained when the refractive index is lowered toward the outside in the radial direction. When the refractive index inclined layer 12 has such condensing function, its refractive index can be lowered step by step in a multistage state.

In the optical fiber according to the embodiment, the most power of light beams with large diameters enter the refractive index inclined layer 12 even the light beams enter the center of the optical fiber. The electric field distribution of the incident light shifts to the core 10 with the higher refractive index as the light propagates in the refractive index inclined layer 12 and finally concentrates in the core 10 with the highest refractive index. Consequently, in roughly speaking, the optical beam having a diameter 2b can be, converted into or concentrated on the optical beam having a diameter of 2a.

The condensing efficiency depends on the coupling efficiency between the incident light and the optical fiber of the embodiment and the transmission loss of the optical fiber of the embodiment. However, when a low loss optical fiber such as a silica fiber is employed, its transmission loss is negligible and thus the condensing efficiency is determined practically by the coupling efficiency alone. In order to obtain high coupling efficiency, the NA (numeric aperture) of the refractive index inclined layer 12 should be set higher than that of the incident beam. Since the NA of the refractive index inclined layer 12 is $(n2_{min}^2-n3^2)^{1/2}$, the more the refractive index difference between $n2_{min}$ and n3 becomes large, the more the coupling efficiency becomes high even with an incident beam with a large broadening angle.

When n1, 2a and $n2_{max}$ are set so as to meet the conditions for a single mode, it is possible to convert incident light of a multi mode into a single mode. For instance, when they are set as $(n1-n2_{max})/n1=0.01$ and $2a=4.5$ μm a cut-off wavelength becomes approximately 1.2 μm and becomes a single mode within a 1.5 μm band used in optical communications.

In order to realize the single mode in a condition that the coupling efficiency is maintained to be high, both relative refractive index differences between $n2_{min}$ and n3 and between n1 and $n2_{max}$ should be enlarged. However,it is difficult to produce a silica fiber having a relative refractive index difference of 1.5% or more due to the manufacturing limitation. To realize both high coupling efficiency and single mode with the limited relative refractive index difference, the relative refractive index difference should be assigned appropriately according to each relative refractive index difference between the layers. From this point of view, in the embodiment, each relative refractive index difference is determined as follows:

$$(n1-n2_{max})/n1=0.3\sim0.8(\%)$$

$$(n2_{min}-n3)/n2_{min}=0.4\sim1.1(\%)$$

$$(n2_{max}-n2_{min})/n2_{max}=0.1\sim0.3(\%)$$

Furthermore, since the realizable relative refractive index difference of the silica fiber is small, even the expression $(n2_{min}-n3)/n2_{min}$ is set to 1.1%, namely the maximum within the above optimum relative refractive index difference, the fiber can be combined only with light having an incident angle under a little over 12 degree. When the silica fiber is to couple with output light from a laser diode which output angle is about 30 degree, the refractive index of the cladding layer 14 should be lowered. When a polymer with refractive index of 1.36 is employed as the cladding layer 14, for instance, the NA becomes approximately 0.5 and the maximum incident angle becomes approximately 30 degree so that the output light from the laser diode which output angle is 30 degree can input efficiently without using any condensing system. Namely, by employing the low refractive index polymer as the cladding layer 14, even the optical beam with the large output angle can be incident into the optical fiber easily and efficiently.

Also, it is possible that the core 10 is doped with an emission element such as a rare earth ion so as to become an optical amplification element. Since intense pumping light can be input through the refractive index inclined layer 12 having the large diameter, high pumping efficiency can be realized.

The structure of the optical fiber according to the embodiment is homogeneous in the longitudinal direction and therefore it can be produced with high productivity by fiberdrawing from a single preform as a continuous fiber. Accordingly, it can be supplied at a low price.

The present invention makes it easy to realize, for example, a high output fiber laser, high output fiber optical amplifier and high performance fiber nonlinear element each using a high output LD and also it is expected that the present invention is utilized in wide industrial fields such as electronics, communications and medical field.

As readily understandable from the aforementioned description, according to the invention, the optical beam of the large diameter can be efficiently concentrated on the core of the small diameter. The structure of the optical fiber according to the invention is homogeneous in the longitudinal direction and thus it can be manufactured low-priced with the high productivity.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical beam diameter reducer, comprising:
   a core having a core refractive index;
   a refractive index inclined layer formed outside the core, the refractive index inclined layer having a refractive index lower than the core refractive index and reducing toward the outside in a radial direction; and
   a low refractive index layer formed outside the refractive index inclined layer, the low refractive index layer having a refractive index lower than a lowest refractive index of the refractive index inclined layer.

2. The optical beam diameter reducer of claim 1 wherein the core, the refractive index inclined layer and the low refractive index layer compose a fiber.

3. The optical beam diameter reducer of claim 1 wherein the low refractive index layer comprises a polymer which refractive index is 1.4 or less.

4. The optical beam diameter reducer of claim 1 which is defined by the following equations:

$$(n1-n2_{max})/n1=0.3\sim0.8(\%)$$

$$(n2_{min}-n3)/n2_{min}=0.4\sim1.1(\%)$$

$$(n2_{max}-n2_{min})/n2_{max}=0.1\sim0.3(\%)$$

where the core refractive index is n1, the maximum refractive index of the refractive index inclined layer is $n2_{max}$, the minimum refractive index of the refractive index inclined layer is $n2_{min}$ and the refractive index of the low refractive index layer is n3.

5. The optical beam diameter reducer of claim 1 wherein the refractive index of the refractive index inclined layer gradually reduces toward the outside in a radial direction.

6. The optical beam diameter reducer of claim 1 wherein the refractive index of the refractive index inclined layer linearly reduces toward the outside in a radial direction.

* * * * *